United States Patent [19]

Young

[11] Patent Number: 5,028,108

[45] Date of Patent: Jul. 2, 1991

[54] BIPOLAR TRANSISTOR INCLUDING OPTICAL WAVEGUIDE

[75] Inventor: Terence P. Young, Chelmsford, United Kingdom

[73] Assignee: GEC-Marconi Limited, Stanmore, United Kingdom

[21] Appl. No.: 366,129

[22] Filed: Jun. 15, 1989

[30] Foreign Application Priority Data

Jun. 16, 1988 [GB] United Kingdom ................. 8814365

[51] Int. Cl.⁵ .............................................. G02B 6/10
[52] U.S. Cl. ............................ 350/96.12; 350/96.14; 357/34
[58] Field of Search ............... 350/96.11, 96.12, 96.13, 350/96.14, 96.15; 357/17, 30, 34, 41, 43

[56] References Cited

U.S. PATENT DOCUMENTS

| | | | |
|---|---|---|---|
| 4,093,345 | 6/1978 | Logan et al. | 350/355 |
| 4,378,629 | 4/1983 | Bozler et al. | 357/41 X |
| 4,382,660 | 5/1983 | Pratt, Jr. et al. | 350/96.14 X |
| 4,388,633 | 6/1983 | Vasudev | 357/17 |
| 4,716,449 | 12/1987 | Miller | 357/30 |

FOREIGN PATENT DOCUMENTS

| | | |
|---|---|---|
| 276115 | 7/1988 | European Pat. Off. . |
| 77151 | 4/1988 | Japan . |
| 8607641 | 12/1986 | PCT Int'l Appl. . |
| 2114768 | 8/1983 | United Kingdom . |

OTHER PUBLICATIONS

"Operation Principle of the Ingaasp/np Laser Transistor" Mori et al., Applied Physics Lett 47(7) Oct. 1, 1985, pp. 649–651.

"Bipolar Transistor Carrier-Injected Optical Modulatory/Switch: Proposal and Analysis" Tada et al., IEEE Electrinics Device Letters, vol. EDL-7, No. 11, Nov. 1986, pp. 605–607.

Primary Examiner—John D. Lee
Attorney, Agent, or Firm—Spencer & Frank

[57] ABSTRACT

An optical device comprises a heterojunction bipolar transistor which includes a light guiding layer to which the base contact is made. A ridge is included adjacent to the light guiding layer and acts as the emitter or collector of the transistor, the ridge also defining the lateral extent of the light guiding region. Current injected via the base contact controls the electric field in the region of the ridge and hence the refractive index of the layer controlling the passage of light transmitted along it.

20 Claims, 1 Drawing Sheet

BIPOLAR TRANSISTOR INCLUDING OPTICAL WAVEGUIDE

BACKGROUND OF THE INVENTION

This invention relates to optical devices and more particularly to transistors which include optical waveguides.

Devices are known in which electronic and optical functions are combined. However, often these require high switching voltages for their operation because of low electro-optic constants or because other electro-optical interactions attenuate the beams.

The present invention arose in an attempt to develop a device combining electronic and optical effects to give improved performance compared to previously known devices.

SUMMARY OF THE INVENTION

According to the invention there is provided an optical device comprising a bipolar transistor which includes an optical waveguide. A device in accordance with the invention may be made particularly compact and is able to operate at relatively low drive voltages. It is believed that such devices may be used with advantage in both linear and non-linear applications. It is preferred that the base layer of the transistor includes the optical waveguide. Where the device is arranged to operate in a linear manner, for example as a switch or a modulator say, only a fraction of the switching or modulation power is required to be fed into the base region of the transistor and the power requirements for electro-optical control of the phase of light through the waveguide are low. The electronic gain in the optical waveguide region ensures that a much larger current or voltage is dropped across the electro-optical interaction region than is fed in at the base electrode, the extra power being drawn through the dc supply rails. This offers significant advantages over conventional p-i-n structures in which the full drive power must be supplied to each element, a requirement which is difficult to meet above a few GHz.

It is preferred that the device includes a ridge which is extensive from a substrate and which is arranged to act as one of the emitter or collector electrode, the ridge defining the lateral extent of the optical waveguide. Vertical confinement within the optical waveguide is achieved by the difference in the refractive indices of layers in the structure. This configuration is particularly advantageous as the ridge offers not only optical lateral confinement but also, where the ridge is the emitter, allows easy access for the base contact.

The transistor may be an n-p-n structure or a p-n-p device. Advantageously the transistor is a heterojunction transistor in which adjoining regions are of similar crystal structure. Such a structure may be relatively easily fabricated as it does not require re-growth steps. In a particularly advantageous embodiment of the invention, the base layer is a ternary or quaternary of InP and is sandwiched, in the region of the waveguide, between InP layers.

Where the device is arranged to operate in a linear fashion, for example, as a switch, typically the base layer has a bandgap energy which differs significantly from the photon energy, for example, the bandgap and operating wavelengths may be 200 nm apart.

However, it may be preferred for some applications of a device in accordance with the invention to arrange that the band gap wavelength of the light guiding layer is substantially similar to the wavelengths of the interacting radiation. This enhances the optical/electrical coupling and enables a highly non-linear device to be produced. It may be advantageous for the optical waveguide to be arranged to act as a laser cavity.

According to a feature of the invention, an optical arrangement includes two devices in accordance with the invention arranged such that their emitters are electrically coupled to form a long-tailed pair. Such an arrangement minimises any difficulties which may occur because of large amounts of charge being transferred through the structure. The input signal is normally supplied between the base and the current drain is fixed. Thus, in operation, one transistor must switch off as the other turns on, giving a sharp switching characteristic. Also, as neither transistor saturates, fast switching may be achieved, thus avoiding charge build-up in the transistor bases and a guasi digital response is obtainable when the arrangement is used in linear devices such as switches. In one embodiment of the invention, the two devices are optically coupled, for example, they may be formed on a common substrate. Advantageously, the optical waveguides of the devices together form a complementary pair in which light transmitted along the waveguides may be arranged to interact. For example, in Mach-Zehnder interferometers light in one guide is retarded relative to that in the other, so that a phase difference accumulates along the structure and gives rise to constructive or destructive interference when the two light signals are combined. Conveniently, the refractive index in one guide is increased and that in the other decreased. Another type of arrangement in which complementary pairs of waveguides are included is a reversal switch.

In one preferred embodiment, the arrangement is a bistable gate. The electronic structure of the long-tailed pair provides a linear small signal response and good limiting/clipping properties. Clipping is achieved because only a certain amount of current may be drawn through either collector. This enables the arrangement to be operated as a binary switch, as overdriving the bases squares off the voltage/current response of the circuit. The electronics may therefore be used to compensate for the "non-binary" switch characteristic of the optical circuit.

The device in accordance with the invention may be a phototransistor, that is, one which is optically triggered. This gives high speed control of switching circuits without parasitic capacitances and may be used to introduce negative feedback to compensate for fabrication variations.

BRIEF DESCRIPTION OF THE DRAWINGS

The invention is now further described by way of example only with reference to the accompanying drawing in which.

DESCRIPTION OF THE PREFERRED EMBODIMENTS

Figure 1:
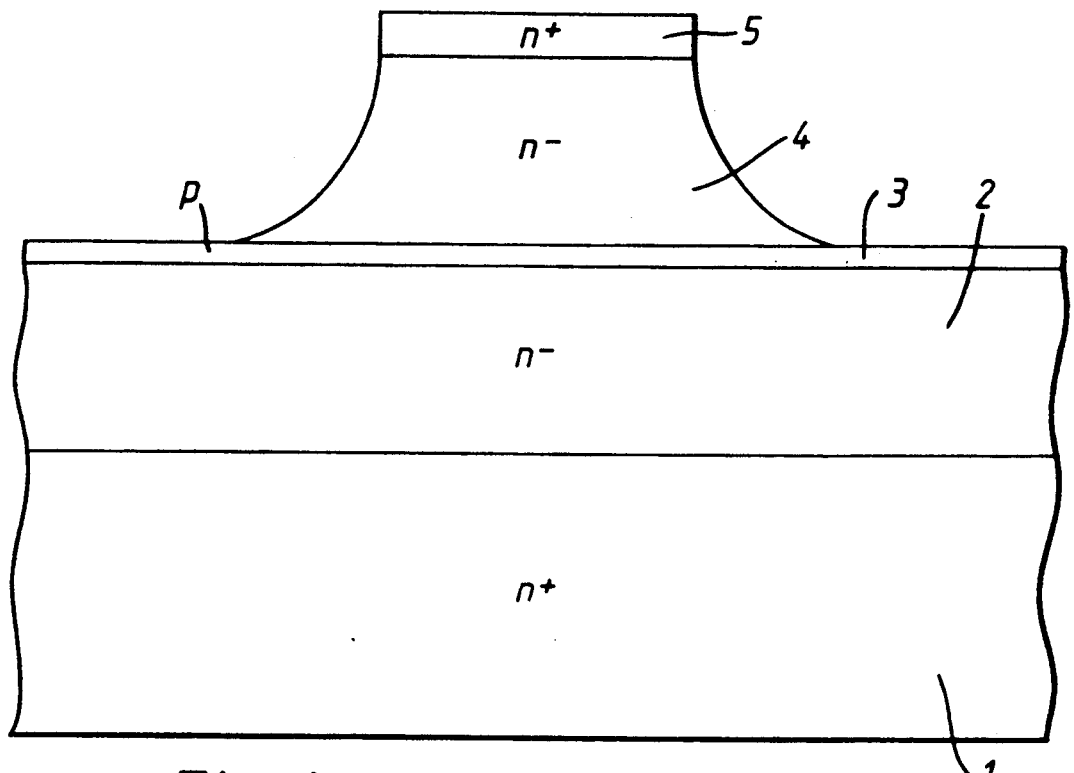
FIG. 1 schematically shows an optical device in accordance with the invention.

With reference to FIG. 1, an n-p-n transistor in accordance with the invention comprises an n+ doped substrate 1 on which an n− InP layer 2 is epitaxially grown.

A layer of p-doped InGaAsP 3 is grown on the epitaxial layer 2. Another epitaxial layer of n⁻ doped InP 4 is grown as a ridge on the p-doped layer 3. An n⁺ doped capping layer 5 is laid down on top of the epitaxial layer 4. The emitter contact of the transistor is made via the capping layer 5 and the collector contact through the substrate 1. The base contact is made to the p-doped layer 3. Because the p-doped layer 3 has a higher refractive index than the InP layers 2 and 4 in the region of the ridge, any light transmitted along the InGaAsP layer 3 is substantially confined by the vertical refractive index difference in the region of the ridge. The ridge also defines the lateral confinement of the light. Current injected via the base contact controls the electric field in the region of the ridge 4 and hence the refractive index of the layer 3 by means of the Pockels effect, Kerr effect and by current injection/depletion. This enables the passage of light transmitted along the waveguide to be controlled. By controlling the current applied to the base 3, the mode velocity in the waveguide may be controlled. It is possible to achieve relatively large changes in the phase of light transmitted through the device. The device may be arranged to be optically triggered.

Figure 2:
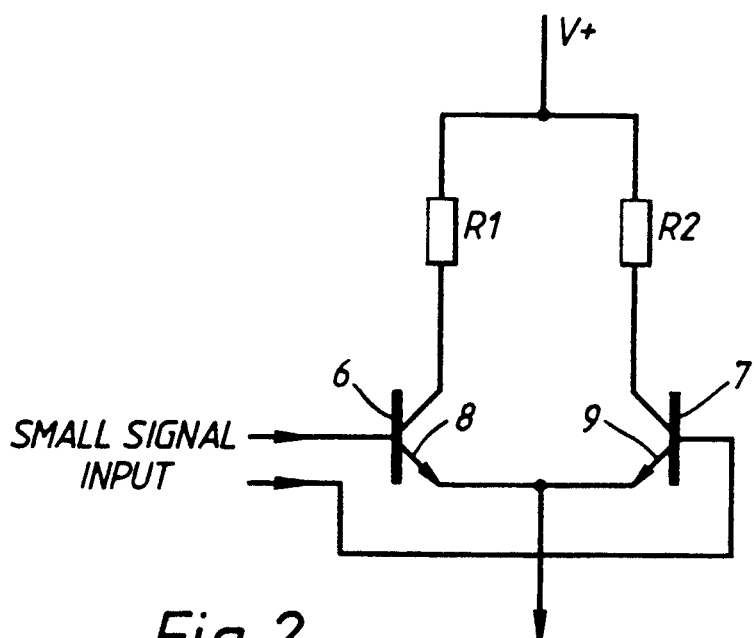
FIG. 2 is a schematic circuit diagram of a long-tail pair arrangement in accordance with the invention.

With reference to FIG. 2, two devices 6 and 7 similar to that illustrated in FIG. 1 are arranged as a long-tailed pair in which their emitters 8 and 9 are connected. The devices 6 and 7 may be formed on the same substrate and their optical waveguides coupled. The arrangement enables high switching speeds and a digital-type response to be achieved. It also may give enhanced non-linearity for optical/optical switching where desired.

In an alternative embodiment of the invention, the emitter contact is made through the substrate and the capping layer of the devices acts as the collector contact. This is particularly advantageous in the long-tailed pair arrangement.

I claim:

1. An optical device comprising a bipolar transistor, said transistor including:
   a semiconductor substrate having at least one surface, said semiconductor substrate constituting a first electrically conductive electrode of said transistor;
   a semiconductor ridge element extending from a surface of said substrate, said ridge element constituting a second electrically conductive electrode of said transistor; and
   a semiconductor optical waveguide region interposed between the at least one surface of said substrate and said ridge element, said optical waveguide region constituting a third electrically conductive electrode of said transistor, light being transmitted along said optical waveguide region in accordance with a current injected therein, said ridge element defining the lateral confinement of light within said optical waveguide region.

2. An optical device as claimed in claim 1 wherein said transistor has a base layer and said optical waveguide region comprises the base layer thereof.

3. An optical device as claimed in claim 2 wherein the base layer of said transistor has a band gap wavelength in said optical waveguide region which is substantially the same as the wavelength of said optical radiation.

4. A device as claimed in claim 1 wherein the transistor is an n-p-n transistor.

5. A device as claimed in claim 1 wherein the transistor is a p-n-p transistor.

6. A device as claimed in claim 1 wherein the current injected into the optical waveguide region of said transistor controls the refractive index of said waveguide.

7. A device as claimed in claim 1 wherein the transistor is a heterojunction transistor.

8. An optical device as claimed in claim 7 wherein said optical waveguide region is a base layer composed of a ternary or quaternary of InP sandwiched, in the region of the waveguide, by InP layers.

9. An optical device as claimed in claim 1 wherein the portions of said substrate and ridge element between which said optical waveguide region is interposed have lower refractive indices than said optical waveguide region, said relative refractive indices effecting vertical confinement of light within said optical waveguide region.

10. An optical device as claimed in claim 9 wherein the portions of said substrate and ridge element between which said optical waveguide region is interposed are composed of a semiconductor material of one conductivity type, and said optical waveguide region is composed of a semiconductor material of the opposite conductivity type.

11. An optical device as claimed in claim 10 wherein the portions of said substrate and ridge element between which said optical waveguide region is interposed are composed of InP, and said optical waveguide region is composed of InGaAsP.

12. An optical device as claimed in claim 1 wherein said first, second and third electrically conductive electrodes constitute the collector, emitter and base electrodes respectively of said bipolar transistor.

13. An optical arrangement including two optical devices, each comprising a bipolar transistor including:
    a semiconductor substrate having at least one surface, said semiconductor substrate constituting one of an emitter and collector of said transistor;
    a semiconductor ridge element extending from a surface of said substrate, said ridge element constituting the other of said emitter and collector of said transistor; and
    a semiconductor optical waveguide region interposed between the at least one surface of said substrate and said ridge element, said optical waveguide region constituting a base of said transistor, light being transmitted along said optical waveguide region in accordance with a current injected therein, said ridge element defining the lateral confinement of light within said optical waveguide region; and
    means electrically coupling the emitters of said bipolar transistors to form a long-tailed pair.

14. An arrangement as claimed in claim 13 wherein light transmitted along the optical waveguide region of one of said two devices interacts with light transmitted along the optical waveguide region of the other of said two devices.

15. An arrangement as claimed in claim 14 wherein the optical waveguides of the devices together form an optically coupled complementary pair.

16. An optical device comprising a bipolar transistor including an optical waveguide, said transistor comprising a substrate, said optical waveguide and a ridge extensive from said substrate, the ridge being connected to act as one of the emitter or collector of the transistor and defining the lateral extent of said optical waveguide region.

17. A device as claimed in claim 16 wherein the optical waveguide is included in the base layer of the transistor.

18. An optical arrangement including two optical devices each comprising a bipolar transistor which includes an optical waveguide, a substrate including the optical waveguide and a ridge extensive from the substrate and connected to act as one of the emitter or collector of the transistor and defining the lateral extent of said optical waveguide, the devices being connected such that their emitters are electrically coupled to form a long-tailed pair.

19. An arrangement as claimed in claim 18 wherein light transmitted along the optical waveguide region of one of said two devices interacts with light transmitted along the optical waveguide region of the other of said two devices.

20. An arrangement as claimed in claim 19 wherein the optical waveguides of the devices together form an optically coupled complementary pair.

* * * * *